(12) United States Patent
Wever et al.

(10) Patent No.: US 9,104,288 B2
(45) Date of Patent: Aug. 11, 2015

(54) METHOD AND APPARATUS FOR PROVIDING QUICK ACCESS TO MEDIA FUNCTIONS FROM A LOCKED SCREEN

(75) Inventors: Pascal Wever, Los Angeles, CA (US); Julian Bleecker, Los Angeles, CA (US); Duncan Burns, Santa Monica, CA (US); Andrew Julian Gartrell, Woodland Hills, CA (US); John-Rhys Newman, Woodland Hills, CA (US); Marco Paglia, San Francisco, CA (US); Ilkka Hyytiainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 155 days.

(21) Appl. No.: 13/043,067

(22) Filed: Mar. 8, 2011

(65) Prior Publication Data

US 2012/0233571 A1    Sep. 13, 2012

(51) Int. Cl.
| | |
|---|---|
| *G06F 3/00* | (2006.01) |
| *G06F 3/048* | (2013.01) |
| *G06F 3/0488* | (2013.01) |
| *H04M 1/725* | (2006.01) |
| *H04M 1/67* | (2006.01) |

(52) U.S. Cl.
CPC .............. *G06F 3/048* (2013.01); *G06F 3/0488* (2013.01); *H04M 1/72544* (2013.01); *H04M 1/67* (2013.01)

(58) Field of Classification Search
CPC .......................... G06F 3/048; G06F 2206/1008
USPC ........................................... 715/835, 863, 823
See application file for complete search history.

(56) References Cited

U.S. PATENT DOCUMENTS

| | | | |
|---|---|---|---|
| 6,501,380 B1 | 12/2002 | Jakobsson | |
| 7,421,656 B2 * | 9/2008 | Fong et al. | 715/716 |
| 7,461,264 B2 * | 12/2008 | Chen | 713/182 |
| 8,199,125 B2 * | 6/2012 | Misawa et al. | 345/173 |
| 2003/0112266 A1 * | 6/2003 | Chang et al. | 345/727 |
| 2004/0001105 A1 | 1/2004 | Chew et al. | |
| 2004/0225502 A1 * | 11/2004 | Bear et al. | 704/270 |
| 2007/0100978 A1 * | 5/2007 | Levi et al. | 709/223 |

(Continued)

FOREIGN PATENT DOCUMENTS

| | | |
|---|---|---|
| EP | 1 109 382 A2 | 6/2001 |
| EP | 2 144 148 A2 | 1/2010 |

(Continued)

OTHER PUBLICATIONS

International Search Report and Written Opinion for Application No. PCT/IB2012/050982 dated Jul. 2, 2012.

(Continued)

*Primary Examiner* — Kieu Vu
*Assistant Examiner* — Andrew Chung
(74) *Attorney, Agent, or Firm* — Alston & Bird LLP

(57) ABSTRACT

A method for providing quick access to functions from a locked screen may include receiving an indication of entry of an activation input at a user terminal while the user terminal is displaying a locked screen, causing a launch of an application associated with performance of a function associated with the application from the locked screen and without completion of an unlock procedure in response to the activation input, enabling the function to be performed while the activation input is provided, and causing the user terminal to revert to the locked screen in response to removal of the activation input. A corresponding apparatus and computer program product are also provided.

18 Claims, 8 Drawing Sheets

(56) References Cited

U.S. PATENT DOCUMENTS

| | | |
|---|---|---|
| 2007/0143851 A1* | 6/2007 | Nicodemus et al. ............ 726/25 |
| 2007/0239837 A1 | 10/2007 | Jablokov et al. |
| 2009/0006991 A1 | 1/2009 | Lindberg et al. |
| 2009/0172542 A1* | 7/2009 | Girish et al. .................. 715/716 |
| 2010/0079794 A1* | 4/2010 | Kim ............................. 358/1.15 |
| 2010/0146235 A1 | 6/2010 | Weber et al. |
| 2010/0159995 A1 | 6/2010 | Stallings et al. |
| 2010/0257490 A1* | 10/2010 | Lyon et al. .................... 715/863 |
| 2010/0269040 A1* | 10/2010 | Lee ............................... 715/702 |
| 2011/0047368 A1 | 2/2011 | Sundaramurthy et al. |
| 2011/0163972 A1* | 7/2011 | Anzures et al. ............... 345/173 |
| 2011/0258547 A1* | 10/2011 | Symons et al. ............... 715/723 |
| 2012/0009896 A1* | 1/2012 | Bandyopadhyay et al. .. 455/411 |
| 2012/0069231 A1* | 3/2012 | Chao ........................ 348/333.01 |
| 2012/0150698 A1* | 6/2012 | McClements, IV ......... 705/27.2 |

FOREIGN PATENT DOCUMENTS

| | | |
|---|---|---|
| EP | 2 161 645 A2 | 3/2010 |
| WO | WO 2009/072852 A2 | 6/2009 |

OTHER PUBLICATIONS

Supplementary European Search Report for Application No. EP 12 75 5136 dated Jul. 22, 2014.

International Preliminary report on Patentability for Application No. PCT/IB2012/050982 dated Sep. 10, 2013.

Supplemantary Search Report for European Application No. 12 75 5136 dated Jul. 22, 2014.

Snappy—the Fastest Camera App for Jailbroken iPhone | Redmond Pie [online] [retrieved Jan. 28, 2015]. Retrieved from the internet: <URL: http://www.redmondpie.com/snappy-the-fastest-camera-app-for-jailbroken-iphone-9140131>. (dated Nov. 22, 2009) 5 pages.

\* cited by examiner

METHOD AND APPARATUS FOR PROVIDING QUICK ACCESS TO MEDIA FUNCTIONS FROM A LOCKED SCREEN

TECHNOLOGICAL FIELD

Some example embodiments of the present invention relate generally to user interface technology and, more particularly, relate to a method and apparatus for providing a multi-stage device transition mechanism that is initiated based on a touch gesture.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to the delivery of services to a user of a mobile terminal. The services may be in the form of a particular media or communication application desired by the user, such as a music player, a game player, an electronic book, short messages, email, content sharing, web browsing, etc. The services may also be in the form of interactive applications in which the user may respond to a network device in order to perform a task or achieve a goal. The services may be provided from a network server or other network device, or even from the mobile terminal such as, for example, a mobile telephone, a mobile television, a mobile gaming system, electronic book or reading device, etc.

In many situations, it may be desirable for the user to interface with a device such as a mobile terminal for the provision of an application or service. A user's experience during certain applications such as, for example, web browsing or navigating through content may be enhanced by using a touch screen display as the user interface. Furthermore, some users may have a preference for use of a touch screen display for entry of user interface commands over other alternatives. In recognition of the utility and popularity of touch screen displays, many devices, including some mobile terminals, now employ touch screen displays. As such, touch screen devices are now relatively well known in the art, with numerous different technologies being employed for sensing a particular point at which an object may contact the touch screen display.

BRIEF SUMMARY

A method, apparatus and computer program product are provided to enable the provision of quick access to media functions from a locked screen. In some cases, for example, the device may be transitioned from a locked state directly into an application having a media function (e.g., a camera application that is able to take a picture, a video application that can capture video, an audio application that can capture audio, a media player that can render media, etc.) for the purposes of utilizing the media function (e.g., creating, using or rendering media) and then reverting to the locked state after the media function is completed.

Some embodiments of the invention may provide a method, apparatus and computer program product for improving user experience relating to devices having touch screen interfaces. As a result, for example, mobile terminal users may enjoy improved capabilities with respect to accessing functions of their devices without a cumbersome unlocking procedure and application launching procedure to slow that access down.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 3A:
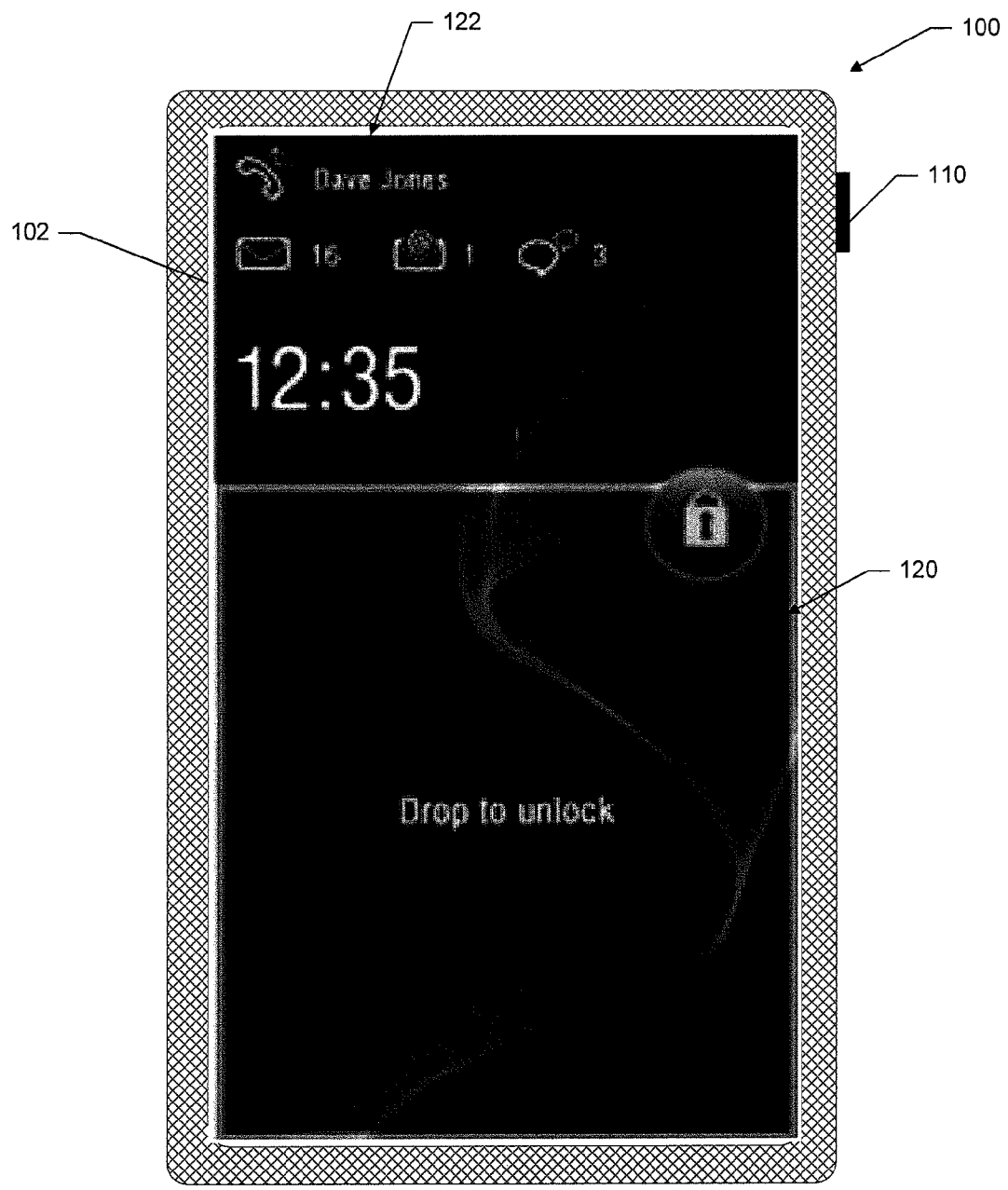
Figure 3B:
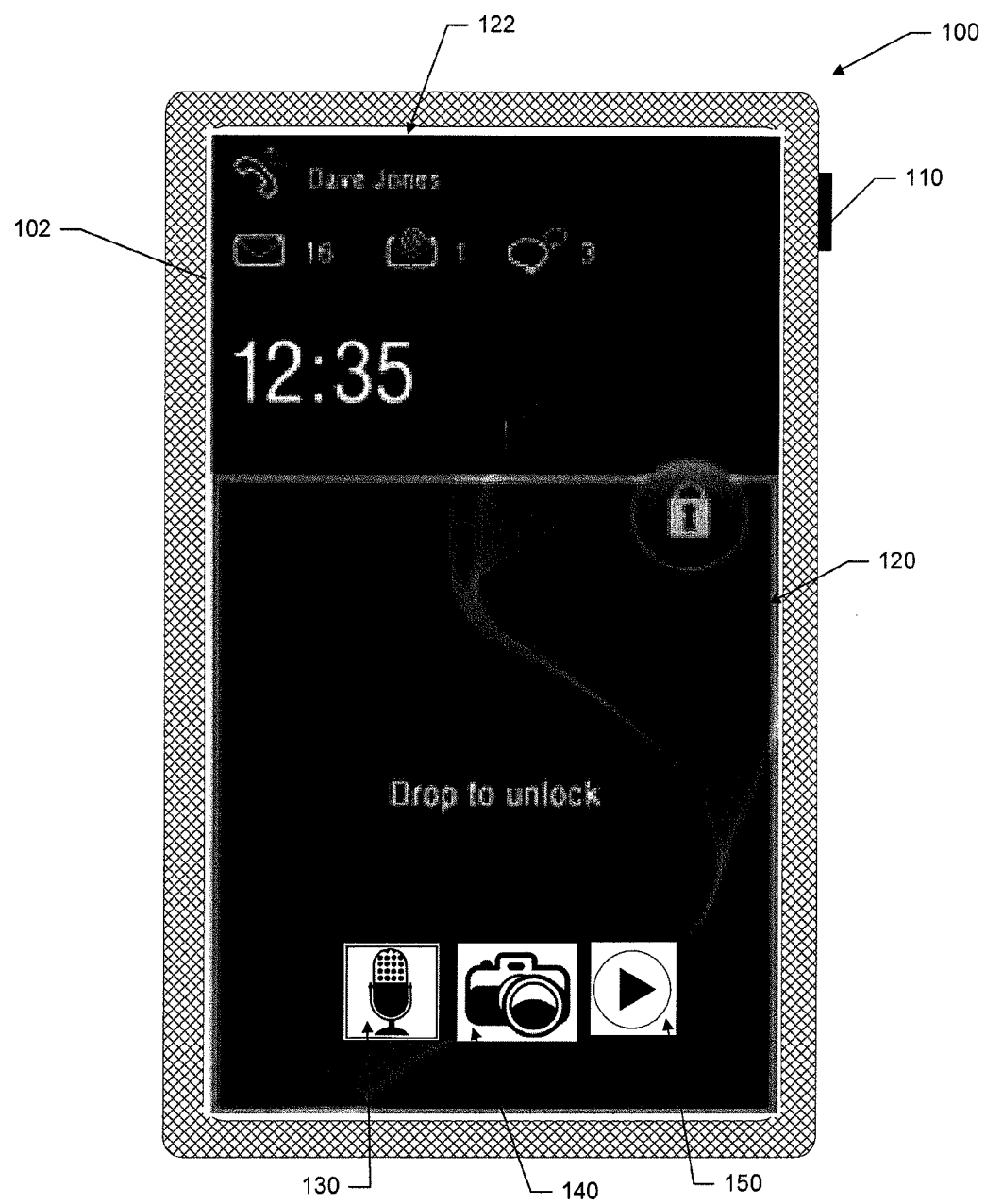
Figure 3C:
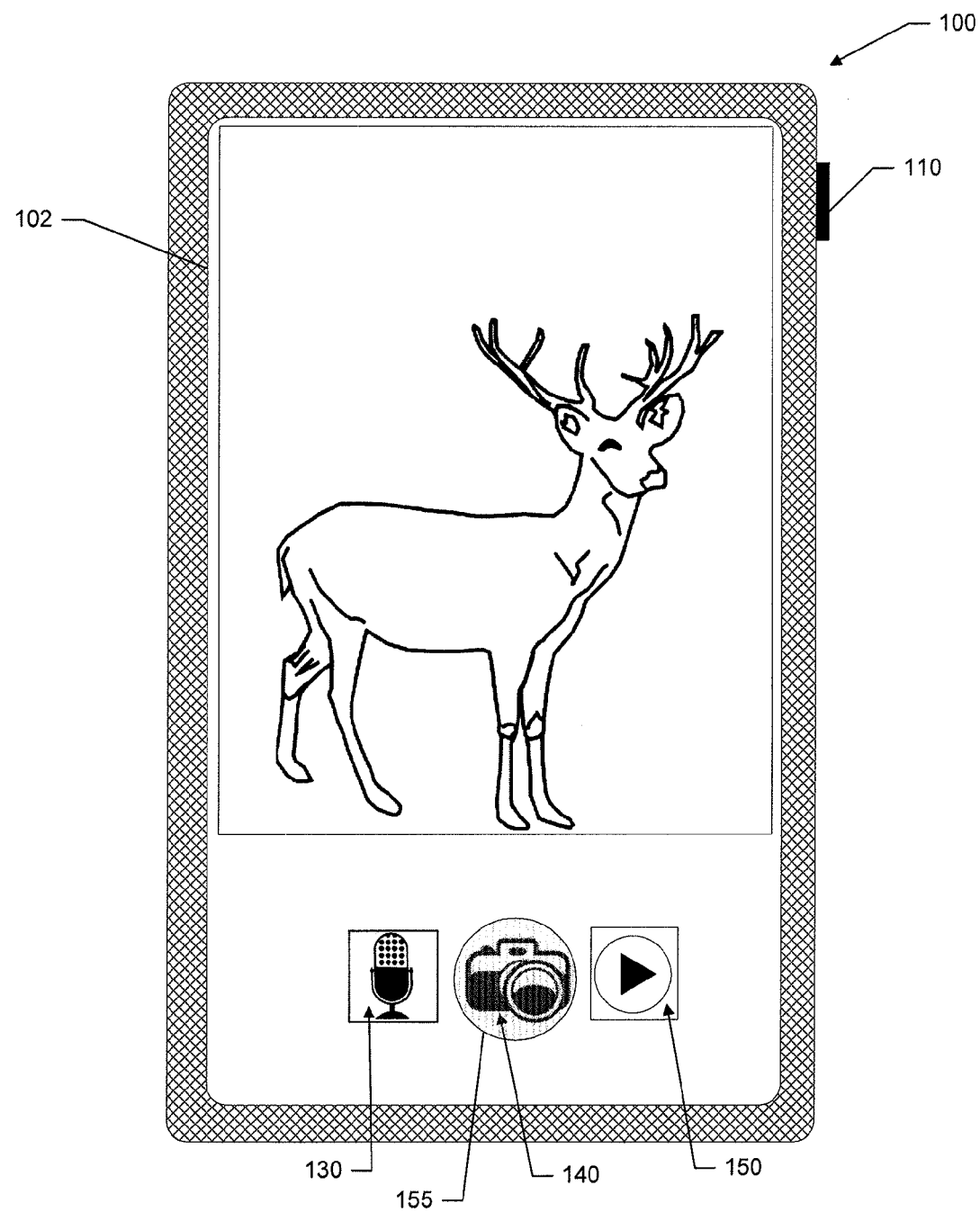
Figure 3D:
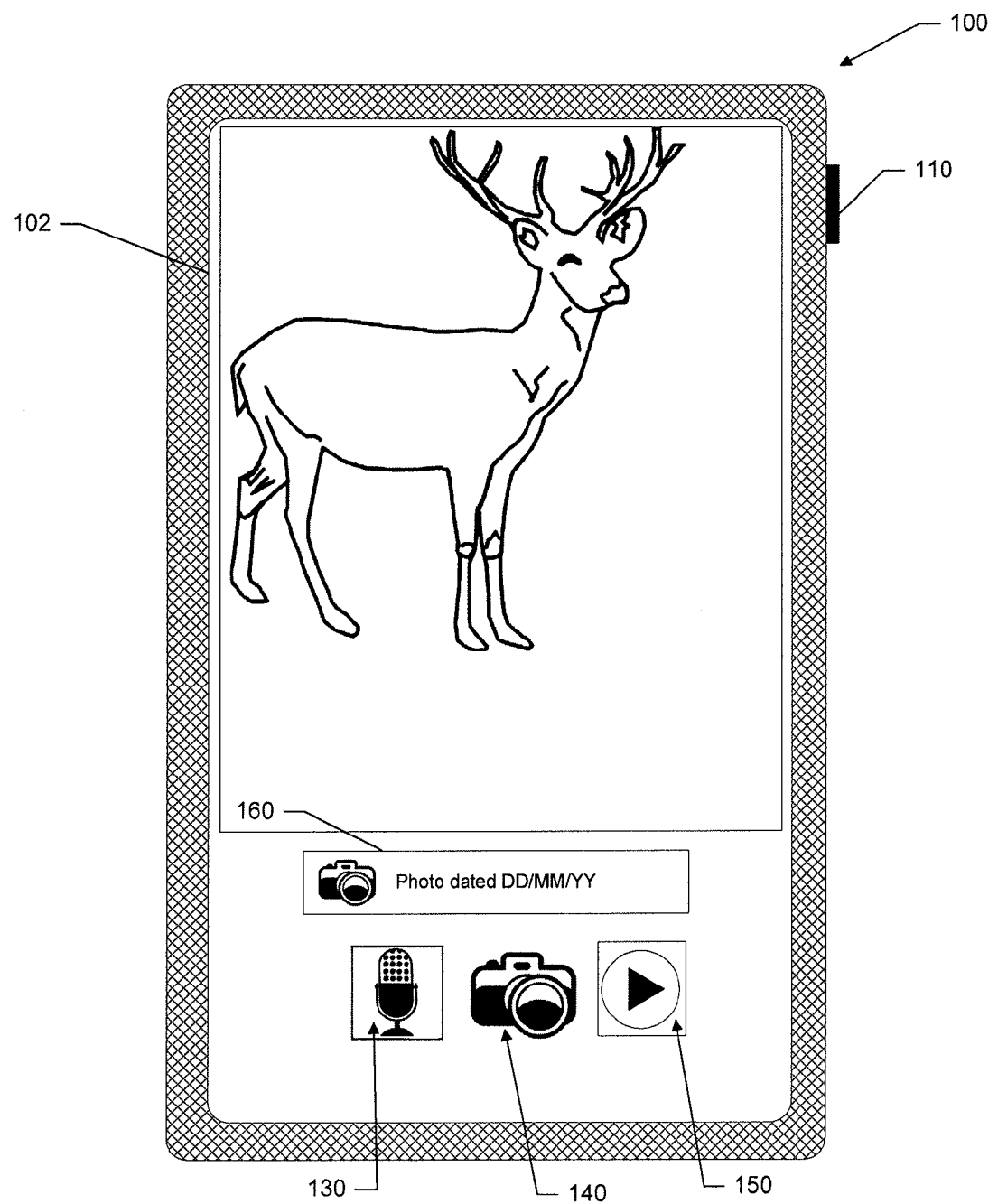
Figure 3E:
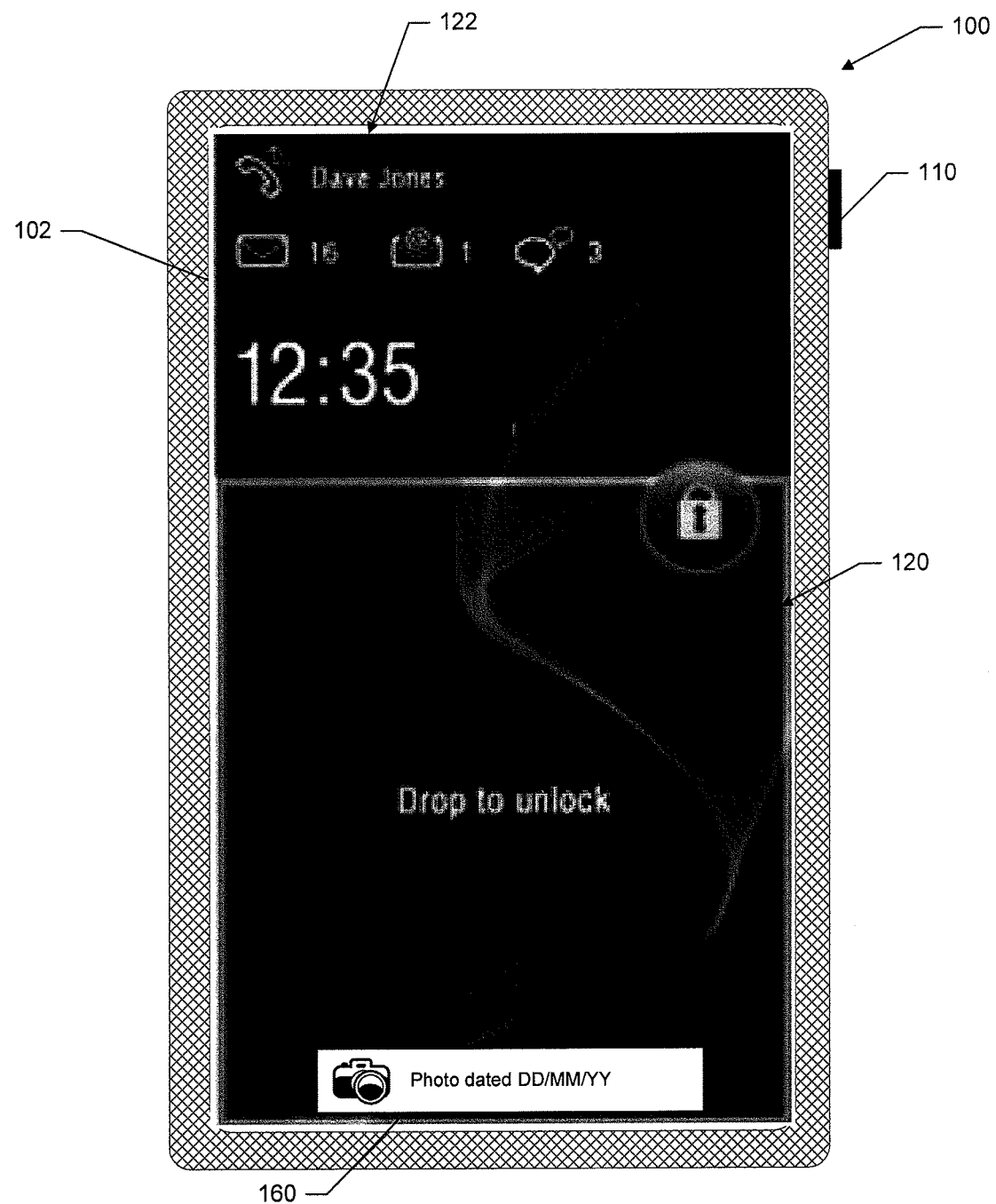
Figure 4:
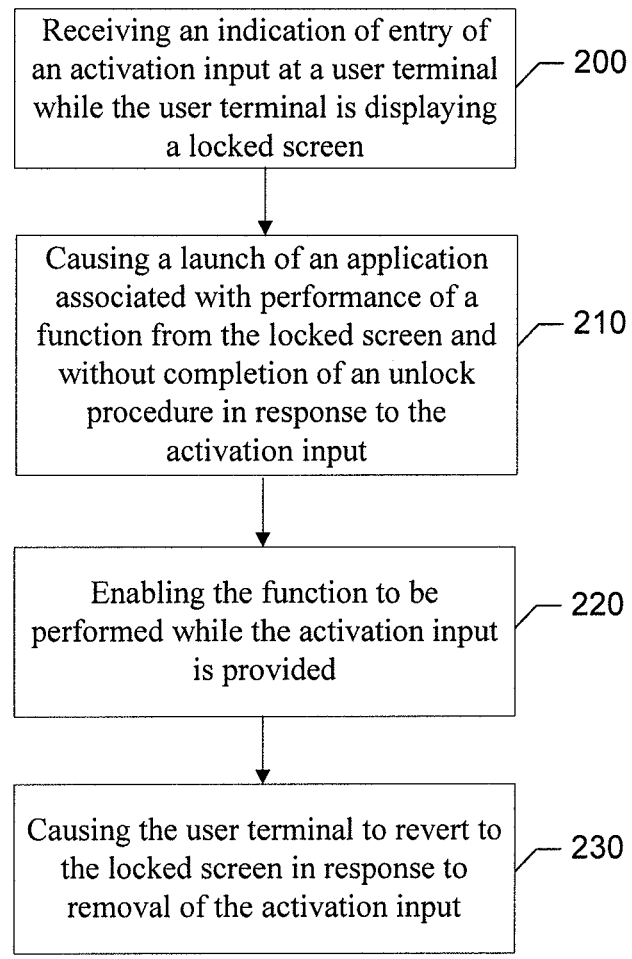

FIG. 3, which includes FIGS. 3A to 3E, shows some examples of display screens that may be presented according to example embodiments of the present invention; and FIG. 4 is a block diagram according to an example method for providing quick access to media functions from a locked screen according to an example embodiment of the present invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

The use of a touch screen interface is often attractive to users due to the generally intuitive nature of the interface. Various activities such as selecting an object, dragging an object, drawing a symbol, turning a page, zooming in or out, and/or the like, are often performed using simple gestures that seem to naturally coincide with the resulting activity. Thus, touch screen devices have been becoming increasingly popular.

Many electronic devices also have multiple different stages or user interface states that may be defined for the devices in order to conserve energy or control access to various different applications or content items. As an example, many devices may have an unlocked state in which the user may directly interact with items presented on the device (e.g., on the home screen or via device menus). The unlocked state may represent a state from which various activities may be undertaken, functions may be initiated and/or applications may be launched. The activities, functions and/or applications may also operate or run in the unlocked state. In a locked state, direct interaction with most functions and/or applications may not be allowed until the device transitions first into the unlocked state. The locked state may provide a locked screen (e.g., presenting either a blank screen or a predetermined wallpaper or other display screen corresponding to a locked user interface). The locked screen may hide content or access mechanisms for accessing content or applications and generally prevent interaction therewith. For example, the locked screen may obstruct the view of the home screen or content associated with an application-specific display screen that was being displayed prior to the device being placed in the locked state. The locked screen may also prevent unintentional activations or interactions with the user interface. For example, many users may put their devices in a pocket, purse or bag, when not in use. In such situations, inadvertent or unintentional contact with other objects would possibly cause many unintended actions or functions to be undertaken by their device if, for example, the contact causes the launch of an application or the execution of a function based on interaction with an icon or soft key. Moreover, when a device is in the locked state (or asleep) power consumption may be reduced by limiting the processing required by the device to run applications, present content or the like.

Many devices provide specific user inputs that may be used to shift the device directly from the locked state to the unlocked state. These specific user inputs may be defined by specific interactions with the touch screen display itself (e.g., a particular swipe configuration, gesture or code entry). In other cases, the specific user inputs may be provided via one or more keys used to shift device state or enter codes, etc. Furthermore, some embodiments may employ a combination of key and gesture interactions. While these interactions that are used to transition from a locked state to an unlocked state to facilitate access to device functionality may be reliable in terms of their ability to unlock the device and avoid unintended interactions, they may be cumbersome and/or time consuming. Thus, in some cases, convenience or time being of the essence may dictate that a more direct approach to accessing certain device functionalities may be preferable.

Some example embodiments of the present invention may provide a mechanism by which to transition directly from the locked state to having access to a particular media function, without having to launch an application associated with the particular media function. As an example, a user may be able to directly transition from a locked state to having the ability to take a picture, capture video/audio, render content, or perform other media related functions. In this regard, instead of unlocking the device and then requiring the user to use the unlocked state to locate and open an application or define a function from the unlocked screen or home screen, the user may be enabled to directly access the function from the locked screen. Thus, some example embodiments may define one or more activation inputs (e.g., a specific gesture or touch input, combination of gestures or touch inputs, key, combination of keys, or combination of one or more keys with one or more gestures or touch inputs) that are directly associated with corresponding one or more media functions such that during the execution of a specific one of the activation inputs, the corresponding one of the defined media functions for that activation input may be executed directly from the locked state. However, after execution of the activation input is secured or stopped, the device may immediately revert to the locked state. Thus, the activation input of some examples not only defines a certain function to be performed directly from the locked screen when executed, but the activation input also defines the duration of the period of time for which the device is not in the locked state. The activation input may have specific activation characteristics that, when met, trigger recognition of the activation input and therefore also trigger the execution of the function associated with the activation input. The activation characteristics may define one or more stimuli corresponding to activation of one or more keys and/or one or more touch gestures along with time criteria or pattern criteria (e.g., order or combination of inputs) associated with the respective stimuli. The time criteria or pattern criteria may help to prevent inadvertent, unintentional or brief contact with an object or objects that approximate the stimuli from triggering execution of the function due to being mistakenly recognized as an instance of the activation input.

Figure 1:
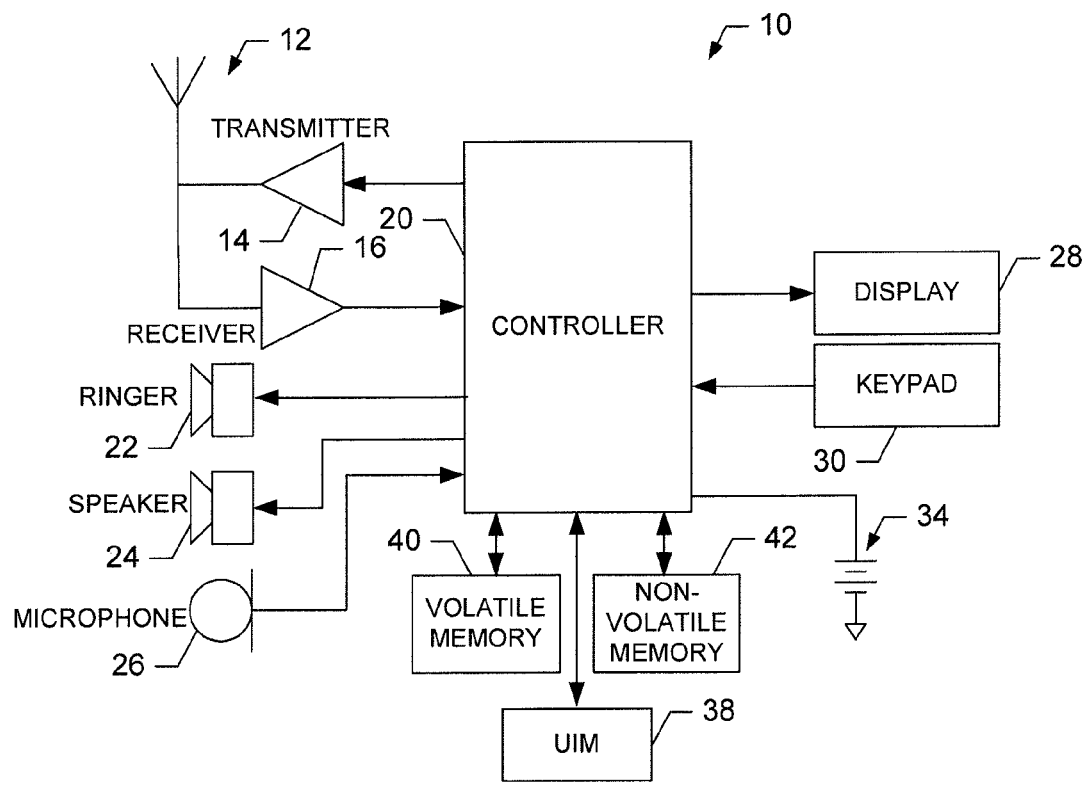
FIG. 1 is a schematic block diagram of a mobile terminal according to an example embodiment of the present invention.

FIG. 1, one example embodiment, illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a controller 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the controller 20 may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing quick access to media functions from a locked screen are displayed. The apparatus 50 of FIG. 2 may be employed, for example, in conjunction with the mobile terminal 10 of FIG. 1. However, it should be noted that the apparatus 50 of FIG. 2, may also be employed in connection with a variety of other devices, both mobile and fixed, and therefore, embodiments of the present invention should not be limited to application on devices such as the mobile terminal 10 of FIG. 1. For example, the apparatus 50 may be employed on a personal computer or other user terminal. Moreover, in some cases, the apparatus 50 may be on a fixed device such as server or other service platform and the content may be presented (e.g., via a server/client relationship) on a remote device such as a user terminal (e.g., the mobile terminal 10) based on processing that occurs at the fixed device.

Figure 2:
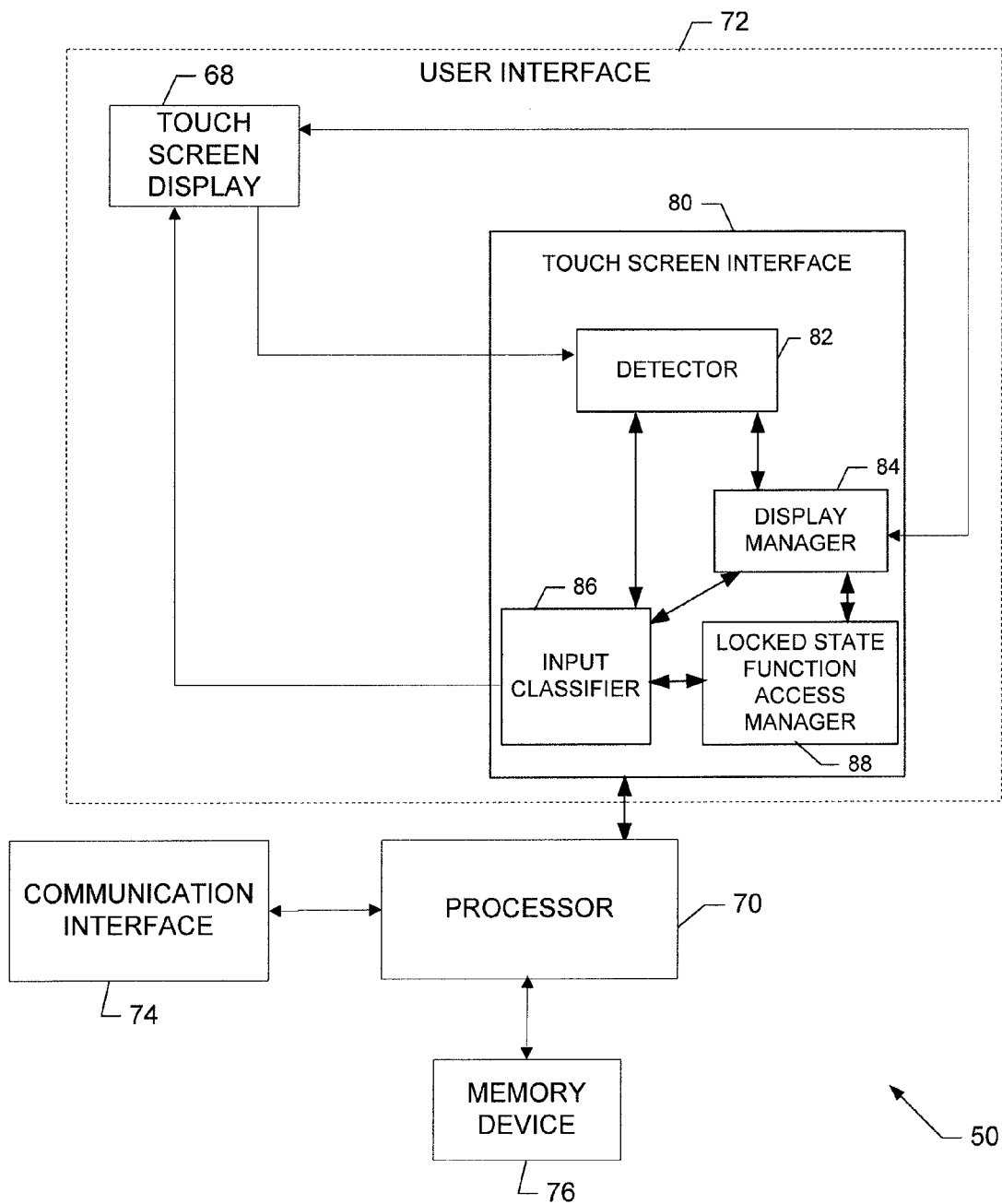
FIG. 2 is a schematic block diagram of an apparatus for providing quick access to media functions from a locked screen according to an example embodiment of the present invention.

It should also be noted that while FIG. 2 illustrates one example of a configuration of an apparatus for providing quick access to media functions from a locked screen, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element.

Referring now to FIG. 2, the apparatus 50 for providing quick access to media functions from a locked screen is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a mobile terminal (e.g., mobile terminal 10) or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a keyboard, a mouse, a joystick, a display, a touch screen(s), touch areas, soft keys, a microphone, a speaker, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a touch screen display 68 (e.g., the display 28). In different example cases, the touch screen display 68 may be a two dimensional (2D) or three dimensional (3D) display. The touch screen display 68 may be embodied as any known touch screen display. Thus, for example, the touch screen display 68 could be configured to enable touch recognition by any suitable technique, such as resistive, capacitive, infrared, strain gauge, surface wave, optical imaging, dispersive signal technology, acoustic pulse recognition, etc. techniques. The user interface 72 may be in communication with the touch screen display 68 to receive indications of user inputs at the touch screen display 68 and to modify a response to such indications based on corresponding user actions that may be inferred or otherwise determined responsive to the indications.

In an example embodiment, the apparatus 50 may include a touch screen interface 80. The touch screen interface 80 may, in some instances, be a portion of the user interface 72. However, in some alternative embodiments, the touch screen interface 80 may be embodied as the processor 70 or may be a separate entity controlled by the processor 70. As such, in some embodiments, the processor 70 may be said to cause, direct or control the execution or occurrence of the various functions attributed to the touch screen interface 80 (and any components of the touch screen interface 80) as described herein. The touch screen interface 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the touch screen interface 80 as described herein. Thus, in examples in which software is employed, a device or circuitry (e.g., the processor 70 in one example) executing the software forms the structure associated with such means.

The touch screen interface 80 may be configured to receive an indication of an input in the form of a touch event at the touch screen display 68. As such, the touch screen interface 80 may be in communication with the touch screen display 68 to receive indications of user inputs at the touch screen display 68 and to modify a response to such indications based on corresponding user actions that may be inferred or otherwise determined responsive to the indications. Following recognition of a touch event, the touch screen interface 80 may be configured to determine a classification of the touch event and provide a corresponding function based on the touch event in some situations.

In some embodiments, the touch screen interface 80 (or the user interface 72 itself) may include a detector 82, a display manager 84, an input classifier 86 and a locked state function access manager 88. Each of the detector 82, the display manager 84, the input classifier 86 and the locked state function access manager 88 may be any device or means embodied in either hardware or a combination of hardware and software configured to perform the corresponding functions associated with the detector 82, the display manager 84, the input classifier 86 and the locked state function access manager 88, respectively, as described herein. In an exemplary embodiment, each of the detector 82, the display manager 84, the input classifier 86 and the locked state function access manager 88 may be controlled by or otherwise embodied as the processor 70.

The detector 82 may be in communication with the touch screen display 68 to receive indications of user inputs in order to recognize and/or determine a touch event based on each input received at the detector 82. The detector 82 may also be in communication with one or more hard keys associated with the user interface 72 that may be used for providing activation inputs as described herein. A touch event may be defined as a detection of an object, such as a stylus, finger, pen, pencil or any other pointing device, coming near or into contact with a portion of the touch screen display in a manner sufficient to register as a touch. In this regard, for example, a touch event could be a detection of pressure on the screen of the touch screen display 68 above a particular pressure threshold over a given area or the detection of a change in the electrostatic field of the touch screen display 68 at a particular location. As such, some touch events may not actually require physical contact with the touch screen display 68. For example, in some cases, the touch screen display 68 may be configured to detect one or more objects (e.g., a finger or fingers) hovering over the touch screen display 68. Gestures associated with the object or objects may also be detected in some cases, even without physical contact with the touch screen display 68. Subsequent to each touch event, the detector 82 may be further configured to pass along the data corresponding to the touch event (e.g., location of touch, length of touch, number of objects touching, touch pressure, speed of movement, direction of movement, length of delay, frequency of touch, etc.) to the input classifier 86 for input classification. In some cases, the detection of key presses (e.g., with respect to hard keys) may also be handled by the detector 82. Thus, the characteristics (e.g., length of time a key is pressed or touch is maintained, shape of a gesture, etc.) of the inputs may be detected by the detector 82 and passed along to the input classifier 86.

The input classifier 86 may be configured to recognize and/or determine a corresponding classification of a touch event or key press. In other words, the input classifier 86 may be configured to perform gesture and/or button press classification to classify the touch event or button press as any of a number of possible gestures or button presses based on the respective characteristics of each event. Some examples of recognizable gestures may include a touch, multi-touch, stroke, character, symbol, shape, swipe, pinch event (e.g., a pinch in or pinch out), a tickle gesture and/or the like. With each gesture, and also for button presses, the time duration of the event may be a characteristic that is used by the input classifier 86 to determine whether the event or stimulus (e.g., touch and/or key press) qualifies as an activation input.

A touch may be defined as a touch event that impacts a single area (without or with minimal movement on the surface of the touch screen display 68 and for any length of time) and then is removed. A multi-touch may be defined as multiple touch events sensed at the same time (or nearly the same time). A stroke event may be defined as a touch event followed immediately by motion of the object initiating the touch event while the object remains in contact with the touch screen display 68. In other words, the stroke event may be defined by motion following a touch event thereby forming a continuous, moving touch event defining a moving series of instantaneous touch positions (e.g., as a drag operation or as a flick operation). Multiple strokes and/or touches may be used to define a particular shape or sequence of shapes to define a character. A pinch event may be classified as either a pinch out or a pinch in (hereinafter referred to simply as a pinch). A pinch may be defined as a multi-touch, where the touch events causing the multi-touch are spaced apart. After initial occurrence of the multi-touch event involving at least two objects, one or more of the objects may move substantially toward each other to simulate a pinch. Meanwhile, a pinch out may be defined as a multi-touch, where the touch events causing the multi-touch are relatively close together, followed by movement of the objects initiating the multi-touch substantially away from each other. In some cases, the objects on a pinch out may be so close together initially that they may be interpreted as a single touch, rather than a multi-touch, which then is modified by movement of two objects away from each other. Touch events may be performed as a single continuous gesture in some cases or may be made up of a series of successive smaller events.

In an example embodiment, the input classifier 86 may be configured to communicate detection information regarding the recognition, detection and/or classification of a touch event and/or key press to the display manager 84. The display manager 84 may be configured to provide control over modifications made to that which is displayed on the touch screen display 68 based on the detection information received from the detector 82 and input classifications provided by the input classifier 86 in accordance with the responses prescribed for each respective gesture classification and implementation characteristic determined by the input classifier 86. In other words, the display manager 84 may configure the display (e.g., with respect to the content displayed and/or the user interface effects presented relative to the content displayed) according to the input classification and implementation characteristic classification determined for a given input event (e.g., touch and/or key press) that may be detected at the display or in association with the apparatus 50.

In an example embodiment, the display manager 84 may be configured to interface with the locked state function access manager 88 in response to a determination (e.g., by the input classifier 86) that an activation input has occurred. The activation input may be a predetermined input (e.g., a touch input, key input or combination thereof) that, when detected, may initiate direct execution of a media function (e.g., a function associated with a media-related application such as a media player or media generation device) from the locked state without transitioning through the unlocked state. When an end of the activation input is detected, the device may revert back to the locked state. In some embodiments, the activation input may be, for example, a specific touch input (or gesture) or combination of touch inputs (or gestures), a key input or combination of key inputs, or a combination key inputs and touch inputs that are directly associated with a corresponding media function.

In an example embodiment, the locked state function access manager 88 may provide access to a specific function or functions that are associated with a corresponding activation input. Thus, for example, the locked state function access manager 88 may include a mapping or other correlation between a stimulus defined by one or more key presses or touch inputs having predefined characteristics and a corresponding media-related function. Several such mappings may associate different stimuli and respective different functions. As an example, a hard key associated with camera functionality may be pressed for a threshold amount of time to directly launch the camera application and enable the user to focus the camera on a desired object. The actual picture may be taken when the hard key is released and the device may then revert to the locked state responsive to release of the hard key (e.g., either immediately or after a predetermined period of time). As one alternative, the picture may be taken responsive to the pressing of another key (hard or soft) or responsive to a touch gesture or selection of an icon displayed on the touch screen and having functionality associated with taking a picture. As yet another alternative, a touch input maintained at a specific location on the display for the threshold period of time (e.g., on a specific icon displayed on the locked screen or on a location that remains active (always or periodically) even on the locked screen) may initiate the activation input. Thus, for example, for a locked screen displayed in a low (or very low) power mode, certain icons may be visible with a reduced or limited number of colors to keep power consumption low. These icons may be interacted with to launch a corresponding application directly from the locked screen operating in the low power mode.

In an example embodiment, after an activation input in the form of a touch input has launched a camera application, a picture may be taken responsive to release of the touch input or responsive to another input inserted in connection with the touch input. However, in some cases, non-touching gestures may also be used input an activation input in situations where the device can detect hovering or the like and a particular non-touching gesture activity has been defined as an activation input. In still other examples, multiple key or touch inputs may be used to initiate the activation input that opens the camera application (e.g., holding two hard keys or initiating two touch events) and still one or more other inputs may take the picture prior to reverting to the locked state after the picture is taken. Moreover, in some cases, the key or touch inputs may be provided in a particular pattern to be recognized as an activation input. For example, two or three consecutive presses, a long-press followed by a short-press, pressing and holding two different keys, pressing one or more keys in a pattern or sequence and/or the like may all act as activation inputs with regard to particular functions or applications. Thus, the activation input may be a single event or multiple events having characteristics that qualify for recognition as an activation input. Moreover, it should be appreciated that similar activation activities may be undertaken for other media related functions such as rendering music or videos, or capturing of video or audio and/or the like. Moreover, in some examples, a hard key, a touch input or combinations of hard key and touch inputs may be used to provide an activation input with respect to a location related application. For example, an activation input may be provided to directly launch an application to indicate current location or to report or share current location with another person or entity. In this regard, for example, a mapping application may be launched to check a location of the device.

In some cases, device security may be enhanced by requiring the entry of a security code in order to exit the locked screen. An example embodiment enabling direct access to media functions without requiring entry of the security code would clearly speed up the action of performing the media function. In some cases, where the action is somewhat fleeting, example embodiments may enable quick access to media functions that permits their capture where other devices that require entry of the security code may miss the action before they are ready to perform the media function. Some users may, however, worry about abuse of the ability to perform media functions without entering a security code. For example, some users may worry that too many pictures may be taken without proper authentication being performed. In order to address this potential concern, some embodiments may provide for a limit to the number of media functions that can be performed without entry of the security code or some other formal authentication process being undertaken. In such an example embodiment, a threshold number of media functions may be performed using direct access via activation inputs. After the threshold number of media functions is reached, the security code may be required to be entered prior to allowing the user to continue to perform media functions. The threshold number may be user defined or factory set and may be user activated or deactivated. In some embodiments, any authorized entry where a formal authentication process is performed (even if it is not related to the use of activation inputs) may reset a counter that counts toward the threshold number.

FIG. 3, which includes FIGS. 3A to 3E, shows some examples of locked screen transitions to access to media functions according to example embodiments using an activation input. In this regard, FIG. 3 illustrates a mobile device 100 having a touch screen display 102. The mobile device 100 of FIG. 3 also has a hard key 110, although the hard key 110 may be absent in some embodiments. The touch screen display 102 may initially be asleep (and therefore perhaps blank or black). In some cases, a press of the hard key 110 or other input such as a shake or touch event to the touch screen display 102 may wake the mobile device 100 so that a locked screen (e.g., locked screen 120) is displayed. As another alternative, the locked screen 120 may be displayed initially. For example, battery conservation technology continues to improve and thus, putting devices completely asleep is becoming less common and less necessary to preserve battery power. Thus, in some cases, all or a portion of the touch screen display 102 may be active and may be enabled to receive touch inputs even in the locked state.

In the example of FIG. 3A, the locked screen 120 may initially be displayed and the locked screen 120 may include some basic information 122 (e.g., user name, time, number of messages, etc.). However, this basic information 122 may not be available for interaction by the user in the locked state. In response to insertion of an activation input using the hard key 110, the locked screen 120 may be modified as shown in FIG. 3B to include one or more icons (e.g., icons 130, 140, 150) with which the user can interact using touch events. The activation input may be provided, for example, by pressing and holding the hard key 110 (alone or in combination with another hard key or in combination with interaction with the touch screen display 102) for at least a predetermined length of time. In this example, after pressing the hard key 110 long enough to gain recognition as the activation input, the icons may be presented. While still holding the hard key 110, the user may select one of the icons (e.g., icon 130 for audio recording, icon 140 for picture taking, or icon 150 for media playback) to initiate a corresponding media function. Responsive to pressing, holding or releasing the icon and/or the hard key 110 (depending on the configuration of the device), media may be captured or rendered accordingly. When the hard key 110 is released, the mobile device 100 may revert to the locked screen 120 view shown in FIG. 3A.

In an alternative embodiment, the locked screen 120 may normally present the icons (130, 140 and 150) as shown in FIG. 3B. In such an example, contact with the icon alone (e.g., for a predetermined length of time) or in connection with a pattern of inputs, or in connection with pressing another key (e.g., the hard key 110), may initiate the activation input to enable access to the corresponding media function directly from the locked screen 120 (and therefore from the locked state) without going through an unlocked state (or unlocked screen). In some cases, the icons may be displayed, but may be inactive until activated by the activation input. However, in other cases, the icons may be provided in a small portion of the touch screen display 102 that remains active and/or receptive to touch input. Thus, although in some embodiments (as described above), pressing and holding the hard key 110 may itself cause a particular media function to be executed during the holding of the hard key 110 or responsive to release of the hard key 110, other example embodiments may not use a hard key at all.

FIG. 3C illustrates an example of a situation where the touch screen display 102 has been transitioned to display of a camera view finder responsive to usage of the icon 140 in connection with provision of an activation input. The selection of icon 140 is shown by the outline of a touch event 155. Release of the icon 140 or release of the hard key 110 (if used) may initiate actual capture of an image. In an example where the hard key 110 is selected in combination with an icon to form the activation input specific to a corresponding function, the holding of at least one key (e.g., the hard key 110) may keep the media function application (in this case the camera application) active. Thus, for example, selection of the hard key in combination with the icon 140 may initiate the activation input specifically for taking pictures and the release of the icon 140 may cause the image in the view finder to be captured. However, as long as the hard key 110 is pressed, further images may be captured using the icon 140.

In some cases, after an image has been taken, an indication 160 may be provided regarding already taken images (or other media that has been captured) while the activation input is maintained as shown in FIG. 3D. Moreover, in some cases, the availability of images captured using the activation input may also be displayed on the locked screen 120 as shown in FIG. 3E. These images may be retrieved (e.g., via selection of the indication 160) and viewed while the activation input is maintained as shown in FIG. 3D, but may also be available normally in the user's gallery that may be accessible via unlock of the device. Thus, media captured via usage of the activation input may be stored in the same manner and/or locations as normally captured media.

In some embodiments, the user may be enabled to define the activation inputs and corresponding functionalities to be instituted for each activation input. The user may also be enabled to select characteristics (e.g., the threshold time or specific gestures or input combinations) of the activation inputs. However, in others, the user may be enabled to modify one or more of the activation inputs, their characteristics and/or the corresponding functionalities based on an existing list of potential activation inputs, characteristics and functionalities. As yet another alternative, users may select to activate or deactivate predefined (or factory set) activation inputs, characteristics and corresponding functionalities.

Accordingly, some example embodiments may provide for enabling users to quickly access certain media functions from the locked screen without transition between a locked state and the unlocked state. As such, example embodiments may provide for an apparatus (e.g., the processor 70 or a chip set including the processor 70) for performing media functions such as capturing audio, video or images, or playback of media relatively quickly and without complications associated with unlocking the device.

FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (either mobile or fixed) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving an indication of entry of an activation input at a user terminal while the user terminal is displaying a locked screen at operation 200 and causing a launch of an application associated with performance of a function (e.g., a media function or function associated with another application such as a mapping application or location related application) from the locked screen and without completion of an unlock procedure in response to the activation input at operation 210. The method may further include enabling the function to be performed while the activation input is provided at operation 220, and causing the user terminal to revert to the locked screen in response to removal of the activation input at operation 230.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, receiving the indication of the activation input may include receiving the indication of selection of a hard key or touch input associated with the activation input for a predetermined length of time. In some cases, receiving the indication of the activation input may include receiving the indication of selection of a hard key or touch input associated with the activation input in a predetermined pattern. Additionally or alternatively, receiving the indication of the activation input may include receiving the indication of a combination of selection of a hard key and touch input associated with the activation input. In some embodiments, causing the launch of the application may include counting a number of application launches performed using the activation input since a last authentication procedure associated with device unlock, launching the application responsive to the number of application launches being less than a predetermined number, and requiring completion of an authentication procedure prior to launching the application in response to the number of application launches being greater than the predetermined number. In an example embodiment, enabling the function to be performed may further include performing the function responsive to removal of the activation input. In some embodiments, receiving the indication of entry of the activation input may include receiving the indication of entry of a user defined activation input that is associated with a corresponding user selected function. In some cases, causing the launch of the application associated with performance of the media function may include causing the launch of a media capturing function or a media playback function.

In an example embodiment, an apparatus for performing the method of FIG. 4 above may comprise a processor (e.g., the processor 70) configured to perform some or each of the operations (200-230) described above. The processor 70 may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the touch screen interface 80 (or respective different components thereof). Additionally or alternatively, at least by virtue of the fact that the processor 70 may be configured to control or even be embodied as the touch screen interface 80, the processor 70 and/or a device or circuitry for executing instructions or executing an algorithm for processing information as described above may also form example means for performing operations 200-230.

An example of an apparatus according to an example embodiment may include at least one processor and at least one memory including computer program code. The at least one memory and the computer program code may be configured to, with the at least one processor, cause the apparatus to perform the operations 200-230 (with or without the modifications and amplifications described above in any combination).

An example of a computer program product according to an example embodiment may include at least one computer-readable storage medium having computer-executable program code portions stored therein. The computer-executable program code portions may include program code instructions for performing operation 200-230 (with or without the modifications and amplifications described above in any combination).

In some cases, the operations (200-230) described above, along with any of the modifications may be implemented in a method that involves facilitating access to at least one interface to allow access to at least one service via at least one network. In such cases, the at least one service may be said to perform at least operations 200 to 230.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising: receiving an indication of entry of an activation input at a user terminal while the user terminal is displaying a locked screen, wherein the activation input comprises depression of a user interface component; causing a launch of an application associated with performance of a function associated with the application from the locked screen and without completion of an unlock procedure in response to the activation input, wherein causing the launch of the application comprises counting a number of application launches performed using the activation input since a last authentication procedure associated with device unlock, launching the application responsive to the number of application launches being less than a predetermined number, and requiring completion of an authentication procedure prior to launching the application in response to the number of application launches being greater than the predetermined number; enabling the function to be performed while the user interface component is depressed, wherein functionality of the user terminal other than the function remains locked; and causing the user terminal to revert to the locked screen in response to removal of the depression.

2. The method of claim 1, wherein receiving the indication of the activation input comprises receiving the indication of selection of a hard key or touch input associated with the activation input for a predetermined length of time.

3. The method of claim 1, wherein receiving the indication of the activation input comprises receiving the indication of selection of a hard key or touch input associated with the activation input in a predetermined pattern.

4. The method of claim 1, wherein receiving the indication of the activation input comprises receiving the indication of activation of a first input component, and the method further comprises:
   in response to the activation of the first input component, initiating a media capturing application; and
   while the activation of the first input component is maintained, and in response to receiving indication of activation of a second input component, causing capture of a media item.

5. The method of claim 1, wherein enabling the function to be performed further comprises performing the function responsive to removal of the activation input.

6. The method of claim 1, wherein receiving the indication of entry of the activation input comprises receiving the indication of entry of a user defined activation input that is associated with a corresponding user selected function.

7. The method of claim 1, wherein causing the launch of the application associated with performance of the function comprises causing the launch of a media capturing function or a media playback function.

8. The method of claim 1, wherein causing the user terminal to revert to the locked screen in response to removal of the activation input comprises causing the user terminal to revert to the locked screen immediately in response to removal of the activation input or to revert to the locked screen a predetermined period of time after removal of the activation input.

9. An apparatus comprising at least one processor and at least one memory including computer program code, the at least one memory and the computer program code configured to, with the processor, cause the apparatus to at least: receive an indication of entry of an activation input at a user terminal while the user terminal is displaying a locked screen, wherein the activation input comprises depression of a user interface component; cause a launch of an application associated with performance of a function associated with the application from the locked screen and without completion of an unlock procedure in response to the activation input, wherein causing the launch of the application comprises counting a number of application launches performed using the activation input since a last authentication procedure associated with device unlock, launching the application responsive to the number of application launches being less than a predetermined number, and requiring completion of an authentication procedure prior to launching the application in response to the number of application launches being greater than the predetermined number; enable the function to be performed while the user interface component is depressed, wherein functionality of the user terminal other than the function remains locked; and cause the user terminal to revert to the locked screen in response to removal of the depression.

10. The apparatus of claim 9, wherein the at least one memory and computer program code are further configured to, with the processor, cause the apparatus to receive the indication of the activation input by receiving the indication of selection of a hard key or touch input associated with the activation input for a predetermined length of time.

11. The apparatus of claim 9, wherein the at least one memory and computer program code are further configured to, with the processor, cause the apparatus to receive the indication of the activation input by receiving the indication of selection of a hard key or touch input associated with the activation input in a predetermined pattern.

12. The apparatus of claim 9, wherein the at least one memory and computer program code are further configured to, with the processor, cause the apparatus to receive the indication of the activation input by receiving the indication of activation of a first input component:
   in response to the activation of the first input component, initiate a media capturing application; and
   while the activation of the first input component is maintained, and in response to receiving indication of activation of a second input component, cause capture of a media item.

13. The apparatus of claim 9, wherein the at least one memory and computer program code are further configured to, with the processor, cause the apparatus to enable the function to be performed further by performing the function responsive to removal of the activation input.

14. The apparatus of claim 9, wherein the at least one memory and computer program code are further configured to, with the processor, cause the apparatus to receive the indication of entry of the activation input by receiving the indication of entry of a user defined activation input that is associated with a corresponding user selected function.

15. The apparatus of claim 9, wherein the at least one memory and computer program code are further configured to, with the processor, cause the apparatus to launch the application associated with performance of the function by causing the launch of a media capturing function or a media playback function.

16. The apparatus of claim 9, wherein the at least one memory and computer program code are further configured to, with the processor, cause the apparatus to cause the user terminal to revert to the locked screen in response to removal of the activation input by causing the user terminal to revert to the locked screen immediately in response to removal of the activation input or to revert to the locked screen a predetermined period of time after removal of the activation input.

17. A computer program product comprising at least one non-transitory computer-readable storage medium having computer-executable program code instructions stored therein, the computer-executable program code instructions comprising program code instructions to: receive an indication of entry of an activation input at a user terminal while the user terminal is displaying a locked screen, wherein the activation input comprises depression of a user interface component; cause a launch of an application associated with performance of a function associated with the application from the locked screen and without completion of an unlock procedure in response to the activation input, wherein causing the launch of the application comprises counting a number of application launches performed using the activation input since a last authentication procedure associated with device unlock, launching the application responsive to the number of application launches being less than a predetermined number, and requiring completion of an authentication procedure prior to launching the application in response to the number of application launches being greater than the predetermined number; enable the function to be performed while the user interface component is depressed, wherein functionality of the user terminal other than the function remains locked; and cause the user terminal to revert to the locked screen in response to removal of the depression.

18. The computer program product of claim 17, wherein program code instructions for causing the user terminal to revert to the locked screen in response to removal of the activation input include instructions for causing the user terminal to revert to the locked screen immediately in response to removal of the activation input or to revert to the locked screen a predetermined period of time after removal of the activation input.

\* \* \* \* \*